(12) United States Patent
Jiang et al.

(10) Patent No.: US 12,127,217 B2
(45) Date of Patent: Oct. 22, 2024

(54) BEAM INDICATION METHODS IN WIRELESS COMMUNICATION SYSTEMS

(71) Applicant: ZTE Corporation, Guangdong (CN)

(72) Inventors: Chuangxin Jiang, Guangdong (CN); Zhaohua Lu, Guangdong (CN); Shujuan Zhang, Guangdong (CN); Zhen He, Guangdong (CN); Ke Yao, Guangdong (CN); Bo Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 367 days.

(21) Appl. No.: 17/852,882

(22) Filed: Jun. 29, 2022

(65) Prior Publication Data

US 2022/0330315 A1 Oct. 13, 2022

Related U.S. Application Data

(63) Continuation of application No. PCT/CN2020/073455, filed on Jan. 21, 2020.

(51) Int. Cl.
*H04B 7/06* (2006.01)
*H04L 5/00* (2006.01)
*H04W 72/23* (2023.01)

(52) U.S. Cl.
CPC ........... *H04W 72/23* (2023.01); *H04L 5/0048* (2013.01)

(58) Field of Classification Search
None
See application file for complete search history.

(56) References Cited

U.S. PATENT DOCUMENTS

| | | |
|---|---|---|
| 10,148,337 B2 | 12/2018 | Ng et al. |
| 10,506,587 B2 | 12/2019 | Guo |
| 10,856,316 B2 | 12/2020 | Liou et al. |
| 11,096,219 B2 | 8/2021 | Huang et al. |
| 11,128,349 B2 | 9/2021 | Wang et al. |
| 11,159,347 B2 | 10/2021 | Ahn et al. |
| 11,323,892 B2 | 5/2022 | Park et al. |

(Continued)

FOREIGN PATENT DOCUMENTS

| | | |
|---|---|---|
| CN | 108023841 A | 5/2018 |
| CN | 109150445 A | 1/2019 |

(Continued)

OTHER PUBLICATIONS

Chinese Notice of Grant of Invention Patent Right issued in CN Patent Application No. 202080091342.2, dated Feb. 29, 2024, 8 pages. English translation included.

(Continued)

*Primary Examiner* — Ajit Patel
(74) *Attorney, Agent, or Firm* — Perkins Coie LLP

(57) ABSTRACT

Methods, systems, and devices for signaling beam indications in mobile communication technology are described. An example method for wireless communication includes transmitting, by a network node to a wireless device, in a current timeslot, a beam reference information in a message comprising information related to transmission parameters for receiving control channel information by the wireless device in a dedicated timeslot that is subsequent to the current timeslot, the beam reference information comprising a quasi colocation configuration or spatial relation configuration.

19 Claims, 4 Drawing Sheets

(56) References Cited

U.S. PATENT DOCUMENTS

| | | | |
|---|---|---|---|
| 11,895,516 B2* | 2/2024 | Lin | H04L 5/0048 |
| 2019/0141693 A1 | 5/2019 | Guo et al. | |
| 2020/0187172 A1 | 6/2020 | Wang et al. | |
| 2021/0014884 A1 | 1/2021 | Yang et al. | |
| 2021/0289548 A1* | 9/2021 | Murray | H04W 72/23 |

FOREIGN PATENT DOCUMENTS

| | | | | |
|---|---|---|---|---|
| CN | 110249573 A | 9/2019 | | |
| CN | 110324900 A | 10/2019 | | |
| CN | 110366250 A | 10/2019 | | |
| CN | 110380834 A | 10/2019 | | |
| CN | 110637495 A | 12/2019 | | |
| CN | 110663282 A | 1/2020 | | |
| EP | 3606195 B1 * | 1/2022 | | H04B 17/373 |
| WO | 2018056728 A1 | 3/2018 | | |
| WO | 2019066618 A1 | 4/2019 | | |

OTHER PUBLICATIONS

European Search Report for EP Patent Application No. 20886829.9, dated Nov. 2, 2022, 9 pages.

Apple Inc., "Discussion on beam measurement and reporting," 3GPP TSG RAN WG1 Meeting #92bis, R1-1804770, Sanya, China, Apr. 16-20, 2018, 8 pages.

Qualcomm Incorporated, "Control channel multi-beam operation," 3GPP TSG RAN WG1 #90, R1-1713420, Aug. 21-25, 2017, Prague, Czech Republic, 6 pages.

International Search Report and Written Opinion mailed on Oct. 28, 2020 for International Application No. PCT/CN2020/073455, filed on Jan. 21, 2020 (7 pages).

Interdigital Inc., "On Beam Indication for PDCCH and PDSCH," 3GPP TSG RAN WG1 Meeting #90, Prague, Czech Republic, R1-1714141, 4 pages, Aug. 21-25, 2017.

ZTE et al., "Details and evaluation results on beam indication," 3GPP TSG RAN WG1 Meeting #91, Reno, USA, R1-1719538, 11 pages, Nov. 27-Dec. 1, 2017.

Chinese office action issued in CN Patent Application No. 202080091342.2, dated Aug. 11, 2023, 19 pages. English translation included.

International Preliminary Report on Patentability issued in International Patent Application No. PCT/CN2020/073455, dated Jul. 26, 2022, 5 pages.

* cited by examiner

200

210 — Transmitting, by a network node to a wireless device, in a current timeslot, a beam reference information in a message comprising information related to transmission parameters for receiving control channel information by the wireless device in a dedicated timeslot that is subsequent to the current timeslot, the beam reference information comprising a quasi colocation (QCL) configuration or spatial relation configuration

310 — Receiving, by a wireless device from a network node, in a current timeslot, a beam reference information in a message comprising information related to transmission parameters for receiving control channel information by the wireless device in a dedicated timeslot that is subsequent to the current timeslot, the beam reference information comprising a quasi colocation (QCL) configuration or spatial relation configuration

FIG. 3

BEAM INDICATION METHODS IN WIRELESS COMMUNICATION SYSTEMS

CROSS-REFERENCE TO RELATED APPLICATIONS

This application is a continuation of International Patent Application No. PCT/CN2020/073455 filed on Jan. 21, 2020, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for signaling beam indications in mobile communication technology, including 5th Generation (5G) and New Radio (NR) communication systems. In one exemplary aspect, this may be achieved by signaling the beam indication in a physical layer (PHY) control message that advantageously enables robust communications in high-speed scenarios (e.g., a high-speed train).

In another exemplary aspect, a wireless communication method is disclosed. The method includes transmitting, by a network node to a wireless device, in a current timeslot, a beam reference information in a message that includes information related to transmission parameters for receiving control channel information by the wireless device in a dedicated timeslot that is subsequent to the current timeslot, the beam reference information including a quasi colocation (QCL) configuration or spatial relation configuration.

In yet another exemplary aspect, a wireless communication method is disclosed. The method includes receiving, by a wireless device from a network node, in a current timeslot, a beam reference information in a message that includes information related to transmission parameters for receiving control channel information by the wireless device in a dedicated timeslot that is subsequent to the current timeslot, the beam reference information including a quasi colocation (QCL) configuration or spatial relation configuration.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 2 shows an example of a wireless communication method, in accordance with some embodiments of the presently disclosed technology.

FIG. 3 shows another example of a wireless communication method, in accordance with some embodiments of the presently disclosed technology.

DETAILED DESCRIPTION 5G and NR systems are being configured to support the Quasi Co-Location (QCL) concept, which assists the UE with synchronization, channel estimation and frequency offset error estimation procedures. Two antenna ports are said to be quasi co-located if properties of the channel over which a symbol on one antenna port is communicated can be inferred from the channel over which a symbol on the other antenna port is communicated. For example, if a wireless device (e.g., UE) knows that the radio channels corresponding to two different antenna ports is QCL in terms of Doppler shift, then the UE can determine the Doppler shift for one antenna port and then apply the result on both antenna ports for channel estimation. This avoids the UE to calculate doppler for both antenna port separately.

In some embodiments, QCL can be used to support the reception of both Physical Downlink Shared Channel (PDSCH) and Physical Downlink Control Channel (PDCCH) transmissions at the UE. In an example, the network node (e.g., gNB) can indicate the antenna port used by a specific resource block is QCL with the antenna port used by the PDSCH and PDCCH. In another example, the gNB can indicate that the antenna port used by specific reference signal is QCL with the antenna port used by the PDSCH or PDCCH transmission.

Figure 1:
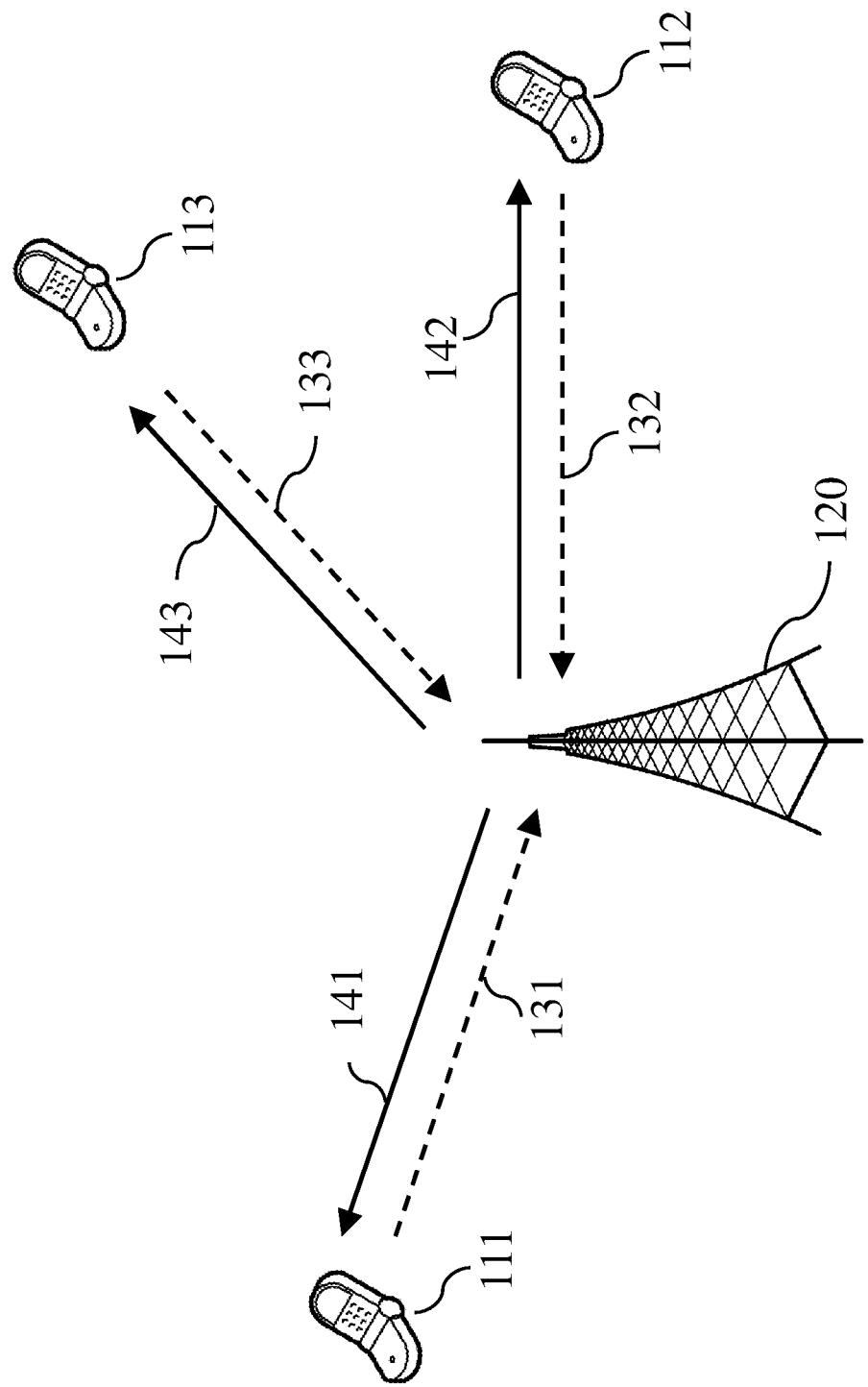
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include a physical layer (PHY) message to indicate the QCL assumption for the PDCCH or PDSCH. The UEs updates its configuration based on the received message and subsequently transmits (131, 132, 133) data to the BS 120. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

In NR, multiple Transmission Configuration Indicator (TCI) states can be configured per Control Resource Set (CORESET) by Radio Resource Control (RRC) signaling to inform UE of the QCL assumption for the PDCCH. Then Medium Access Control (MAC) Control Element (CE) signaling is used to activate one of the TCI states that were previously configured using the RRC signaling. Since MACCE signaling is much faster than RRC signaling (since RRC operates in a high network layer than the MAC), this two-step structure is efficient for updating the PDCCH QCL assumption. However, using MACCE signaling to update QCL assumption of PDCCH may not be sufficient in high-mobility environments.

In the NR implementation, $M1 \leq 128$ TCI states are usually configured under PDSCH configuration (denoted PDSCH-Config). For each CORESET, $M2 \leq 64$ TCI states are selected from M1 TCI states by RRC signaling. Then, MACCE signaling is used to activate one TCI state from M2 TCI states for each CORESET. Since the interval between two MACCE transmission is usually several milliseconds, updating the PDCCH QCL assumption using MACCE signaling may not be sufficient in high-mobility environments.

Embodiments of the disclosed technology use a physical layer (PHY) control message, which operates in a lower network layer than the MAC, to dynamically update the QCL assumption, and advantageously enables robust communications in high-speed scenarios.

In some embodiments, the Downlink Control Information (DCI) can be used to update the beam reference of PDCCH for a PDCCH transmission in a dedicated timeslot, where the beam reference is used to indicate or update the QCL assumption or spatial relation information. In other words, the beam reference corresponds to a TCI state or spatial relation.

In some embodiments, a DCI field (named TCI_PDCCH field) may be used. For example, X1 bits in DCI format 0_1 or 1_1 or 0_2 or 1_2 are used to indicate one or more beam reference (BR) indices for one or more CORESETs. As shown in Table 1, X1=2 bits corresponds to X2=4 codepoints of TCI_PDCCH field values.

In some embodiments, the TCI_PDCCH field comprises an indication that corresponds to multiple BRs, wherein each BR is for one CORESET. One codepoint refers to one value of the indication of TCI_PDCCH field. In some embodiments, the TCI_PDCCH field is used to dynamically select one value to indicate multiple BRs for multiple CORESETs. In Table 1, if TCI_PDCCH field value is 1, BR 2 and 3 are indicated for CORESET 1 and 2 respectively.

In some embodiments, higher layer signaling (e.g., RRC or MACCE signaling) is used to provide a mapping between one value of the TCI_PDCCH field and one (or more) pairs of (CORESET ID, BR index) values. In an example, one codepoint of the TCI_PDCCH field correspond to Y1 pairs of CORESET ID and BR index. As seen in Table 1, Y1=2, and one TCI_PDCCH value indicates two BR indices for CORESET 1 and 2. That is, higher layer singling is used to provide the mapping between a plurality of indications and a plurality beam reference indices for each CORESET.

TABLE 1

| X1 = 2 bits in DCI used to indicate the beam reference for CORESETs | | | | |
|---|---|---|---|---|
| TCI_PDCCH field value | CORESET ID | BR index of CORESET 1 | CORESET ID | BR index of CORESET 2 |
| 0 | 1 | 0 | 2 | 0 |
| 1 | 1 | 2 | 2 | 3 |
| 2 | 1 | 4 | 2 | 6 |
| 3 | 1 | 5 | 2 | 5 |

In some embodiments, Y1 is the number of configured CORESETs to a UE.

In some embodiments, and once the PDCCH is detected by UE, the beam references of all Y1 CORESETs may be updated.

In some embodiments, only the beam reference of the CORESET associated with the PDCCH may be indicated. Herein, beam references of other CORESETs that are not associated with the PDCCH are not updated. Specifically, if a PDCCH links to a CORESET i, the TCI_PDCCH value in this PDCCH indicates the beam reference is only for CORESET i.

In some embodiments, the DCI field 'TCI_PDCCH' can be configured as a new DCI field that is different from the DCI fields in the existing DCI format 1_1, 0_1, 0_2 or 1_2 (e.g., as specified in 3GPP Technical Specification 38.212). In some embodiments, the DCI field 'TCI_PDCCH' can be configured in a common DCI wherein multiple TCI_PDCCH fields are configured for more than one UE.

In other embodiments, the DCI field 'TCI_PDCCH' can be configured to operate substantially similarly to an existing DCI field. For an example, the existing DCI field can be the TCI field. For another example, the existing DCI field can be an SRS Resource Indicator (SRI, wherein SRS refers to the Sounding Reference Signal).

In some embodiments, one codepoint of TCI field (or TCI_PDCCH field) can be configured to correspond to one BR index for PDSCH and Y1 pairs of CORESET ID and BR index. As shown in Table 2, one value of the TCI field corresponds to three BR indices for CORESET 1, 2 and PDSCH.

TABLE 2

| X1 = 2 bits in DCI used to indicate the beam reference for CORESETs and PDSCH | | | | | |
|---|---|---|---|---|---|
| TCI field value | CORESET ID | BR index for CORESET 1 | CORESET ID | BR index for CORESET 2 | BR index for PDSCH |
| 0 | 1 | 0 | 2 | 0 | 0 |
| 1 | 1 | 2 | 2 | 3 | 2 |
| 2 | 1 | 4 | 2 | 6 | 6 |
| 3 | 1 | 5 | 2 | 5 | 5 |

In some embodiments, and to support flexible configuration for each CORESET, MACCE signaling is used to activate X2 beam reference IDs which are selected from the RRC configured beam references. Herein, X2 beam references correspond to X2 TCI_PDCCH codepoints. In other words, for each CORESET, MACCE signaling is used to activate or select one beam reference for each TCI_PDCCH codepoint from the RRC configured beam references.

For example, a MACCE message comprising the CORESET ID and X2 beam reference IDs corresponding to X2 TCI_PDCCH codepoint values, respectively, is used to activate X2 beam references for the CORESET that is identified using the CORESET ID in the MACCE message (e.g., as shown in Table 3 for X2=4). For another example, and for different CORESETs, separate MACCE messages can be transmitted to activate X2 beam references.

TABLE 3

One MACCE message activates X2 = 4 beam references for a CORESET

Serving cell ID
CORESET ID
BR ID for codepoint 0
BR ID for codepoint 1
BR ID for codepoint 2
BR ID for codepoint 3

In some embodiments, the BR ID in the MACCE message may be the relative beam reference ID instead of absolute beam reference ID if the BR ID is selected from M2 BRs that are selected from M1 BRs.

In other embodiments, one combined MACCE message can be used to carry multiple CORESET IDs, the associated TCI_PDCCH codepoint values and the corresponding beam reference IDs for those CORESETs.

In some embodiments, for each CORESET, MACCE signaling is used to activate X2' beam reference IDs correspond to X2 TCI_PDCCH codepoints. In an example, X2'≥X2. Then for some codepoints, more than one beam reference IDs are configured for the CORESET. For different CORESETs, separate MACCE messages can be transmitted to activate X2' beam references.

In some embodiments, one codepoint of TCI field (or TCI_PDCCH field) can be configured to correspond to more than one BR indices for PDSCH and one or more pairs of CORESET ID and BR index. Then, for some codepoints, more than one beam reference IDs are configured for PDSCH.

In some embodiments, X2' can be equal to or greater than the number of codepoints. In other embodiments, X2' can be lesser than X2, and wherein some codepoints may not be used to indicate beam references. In yet other embodiments, X2' may be independently configured for different signals, e.g. CORESET and PDSCH, or CORESET1 and CORESET 2.

As described above, the DCI field can be configured to update beam information of PDCCH on a per CORESET basis for a dedicated timeslot. It should be noted that the DCI field in timeslot (or slot) n cannot be used to indicate beam information of PDCCH that is also transmitted in timeslot n. This is due to the fact that the UE must know the beam information (and use it for configuration) before the UE receives the PDCCH in slot n. Thus, it is impractical for the UE to detect and extract beam information from the DCI transmitted in slot n and simultaneously apply the beam information in the same timeslot.

In an example, it is assumed that the DCI is transmitted in slot n, and the corresponding Acknowledgement (ACK)/Negative ACK (NACK) feedback is transmitted in slot n+(K0+K1 time units) or in slot n+K0+(K1 time units) if the PDSCH scheduled by this DCI is transmitted in slot n+K0 or in slot n+(K0 time units). In this scenario, embodiments of the disclosed technology can use the following configurations:

(1) The BR indicated by DCI in slot n is applied for PDCCH that is transmitted K time units after time unit n.
(2) The BR indicated by DCI in slot n is applied for PDCCH that is transmitted K time units after slot n+K0 or slot n+(K0 time units).
(3) The BR indicated by DCI in time unit n is applied for PDCCH that is transmitted K time units after slot n+(K0+K1 time units) or slot n+K0+(K1 time units).

For these configurations, K can be configured by RRC signaling, or K is predefined, or K is based on UE capability. Similarly, K0 and K1 can be default values, or indicated by the DCI message, or configured by higher layer signaling. With regard to notation, slot n+(M time units) refers to M time units after slot n, and slot n+N+(M time units) refers to M time units after slot (n+N), wherein a time unit can be a slot, one or more symbols or a subframe.

In some embodiments, one DCI field can be used to indicate beam reference of more than one of following signals: PDCCH, PDSCH, Physical Uplink Control Channel (PUCCH), Physical Uplink Shared Channel (PUSCH), Channel State Information (CSI)-Reference Signal (RS) and SRS.

As shown in the example in Table 4, one TCI field value corresponds to multiple beam references for CORESETs, PDSCH and PUCCH resources. In some embodiments, the DCI field can be a new DCI field (e.g., TCI_X, where X=PDSCH or X=PUCCH). In other embodiments, the DCI field can be an existing DCI field.

TABLE 4

X1 = 2 bits in DCI used to indicate beam reference for CORESETs, PDSCH and PUCCH

| TCI field value | BR index for CORESET 1 | BR index for CORESET 2 | BR index for PDSCH | BR index for PUCCH resource 0 | BR index for PUCCH resource 1 |
| --- | --- | --- | --- | --- | --- |
| 0 | 0 | 0 | 0 | 0 | 0 |
| 1 | 2 | 3 | 2 | 2 | 3 |
| 2 | 4 | 6 | 6 | 4 | 6 |
| 3 | 5 | 5 | 5 | 5 | 5 |

In some embodiments, an independent MACCE message for each CORESET, each PUCCH resource, each PUCCH resource group or each PDSCH, can be used to select X2' beam references from the RRC configured beam references. In some embodiments, X2' can be equal to or greater than the number of codepoints. In other embodiments, X2' can be lesser than X2, and wherein some codepoints may not be used to indicate beam references. In yet other embodiments, X2' may be independently configured for different signals, e.g. CORESET and PDSCH, or CORESET1 and CORESET 2.

In existing implementations, if the number of RRC configured BRs is M', then $\log_2 M'$ bits are needed for each codepoint for one CORESET, one PUCCH resource, one PUCCH resource group, or one PDSCH. For example, if M'=128, then $\log_2 128=9$ bits are needed for each codepoint and 4×9=36 bits are needed to support codepoints 0, 1, 2 and 3. This overhead for MACCE signaling seems prohibitive.

In some embodiments, and to alleviate the signaling overhead, a MACCE message (denoted a first MACCE) can be used to activate M3 BRs from the RRC configured BRs for more than one of following: PDSCH, PDCCH, PUCCH, PUSCH, SRS or CSI-RS. Then, an independent MACCE message (denoted a second MACCE) for each CORESET, each PUCCH resource, each PUCCH resource group, PDSCH, each SRS resource or CSI-RS resource, can be used to select X3 beam references from M3 activated BRs.

In some embodiments, X3 may be different for different signals. Although the number of RRC configured BRs to the UE may be large, e.g. 128, the number of instantaneous beams used during any short time interval are much fewer. Therefore, the M3 BRs that are activated will typically be much smaller than the total number of BRs configured (e.g., 128). This advantageously reduces the MACCE overhead.

In some embodiments, the SRS described above may not contain SRS for beam management since the gNB may configure any beam for an SRS resource for beam management in order to test an unknown beam direction. In other words, a MACCE message can be used to activate M3 BRs from the RRC configured BRs for more than one of following: PDSCH, PDCCH, PUCCH, PUSCH, SRS for codebook, non-codebook or antenna switching or CSI-RS. Then, an independent MACCE message for each CORESET, each PUCCH resource, each PUCCH resource group, PDSCH, each SRS resource or each CSI-RS resource, can be used to select X3 beam references from the M3 activated BRs.

For example, a MACCE message can be used to activate M3 BRs from the RRC configured BRs for PDSCH, PDCCH and PUCCH. Then, an independent MACCE message for each CORESET, each PUCCH resource or PDSCH, is used to select X3 beam references from the M3 activated BRs.

In some embodiments, and as shown in Table 5, M3 BRs are selected by MACCE from M' RRC configured BRs. In Table 5, the Serving Cell ID field indicates the identity of the Serving Cell for which the MAC CE applies and the BWP ID field indicates a downlink Bandwidth Part (BWP) for which the MAC CE applies. Furthermore, setting the Bi field to 1 indicates that the BR with index i is to be activated, whereas setting the Bi field to 0 indicates that the BR with index i is to be deactivated. The total number of Bi with value 1 is M3.

TABLE 5

| M3 BRs are activated by a MACCE message |
| --- |
| Serving cell ID |
| BWP ID |

TABLE 5-continued

| M3 BRs are activated by a MACCE message |
| --- |
| $B_0$ |
| $B_1$ |
| ... |
| $B_{M'-1}$ |

For an example, assume M3=16, X3=1 for each CORESET and each PUCCH resource, and X3=8 for PDSCH. As shown in Table 6, for each CORESET, only $\log_2 M3=4$ bits are needed to select one BR from M3 BRs. In this case, it is not needed to use DCI field for beam indication of PDCCH.

TABLE 6

| One MACCE message activates 1 BR from M3 BRs that are activated by another MACCE for a CORESET |
| --- |
| Serving cell ID |
| CORESET ID |
| BR ID from M3 BRs |

As shown in Table 7, for each PUCCH resource, only $\log_2 M3=4$ bits are needed to select one BR from M3 BRs. In this case, the DCI field need not be used for beam reference indication of PUCCH.

TABLE 7

| One MACCE message activates 1 BR from M3 BRs that are activated by another MACCE for a PUCCH resource |
| --- |
| Serving cell ID |
| BWP ID |
| PUCCH resource ID |
| BR ID from M3 BRs |

TABLE 8

| One MACCE message activates X3 BRs from M3 BRs that are activated by another MACCE for PDSCH |
| --- |
| Serving cell ID |
| BWP ID |
| $T_0$ |
| $T_1$ |
| ... |
| $T_{M3}$ |

As shown in Table 8 for PDSCH, M3 bits of a bitmap instead of M' bits are used to activate X3=8 BRs from M3 BRs. In other words, the two MACCE messages are associated. The first MACCE message activates M3 BRs from the RRC configured BRs, and the second MACCE message further activates X3 BRs from M3 BRs that were activated by the first MACCE.

In some embodiments, the second MACCE message to update BRs for PDSCH can be the first MACCE. This would render Table 8 unnecessary in this scenario since an independent MACCE message for each CORESET, each PUCCH resource, each PUCCH resource group, each SRS resource or each CSI-RS resource, can be used to select X3 beam references from the activated BRs, i.e. M3=X3 for this example.

In some embodiments, the TCI_PDCCH field is used to indicate beam references from the second MACCE, wherein the second MACCE provides the mapping between a plurality of indications and a plurality beam reference indices for each CORESET, PDSCH or each PUCCH resource. In other embodiments, the TCI_PDCCH field can also be used for PUCCH resource indication.

FIG. 2 shows an example of a wireless communication method. The method 200 includes, at operation 210, transmitting, by a network node to a wireless device, in a current timeslot, a beam reference information in a message comprising information related to transmission parameters for receiving control channel information by the wireless device in a dedicated timeslot that is subsequent to the current timeslot, the beam reference information comprising a quasi colocation (QCL) configuration or spatial relation configuration.

FIG. 3 shows another example of a wireless communication method. The method 300 includes, at operation 310, receiving, by a wireless device from a network node, in a current timeslot, a beam reference information in a message comprising information related to transmission parameters for receiving control channel information by the wireless device in a dedicated timeslot that is subsequent to the current timeslot, the beam reference information comprising a quasi colocation (QCL) configuration or spatial relation configuration.

In some embodiments, the following technical solutions can be implemented:

A1. A method for wireless communication, comprising: transmitting, by a network node to a wireless device, in a current timeslot, a beam reference information in a message comprising information related to transmission parameters for receiving control channel information by the wireless device in a dedicated timeslot that is subsequent to the current timeslot, wherein the beam reference information comprises a quasi colocation (QCL) configuration or spatial relation configuration.

A2. A method for wireless communication, comprising: receiving, by a wireless device from a network node, in a current timeslot, a beam reference information in a message comprising information related to transmission parameters for receiving control channel information by the wireless device in a dedicated timeslot that is subsequent to the current timeslot, wherein the beam reference information comprises a quasi colocation (QCL) configuration or spatial relation configuration.

A3. The method of solution A1 or A2, wherein the message comprising information related to transmission parameters is a Downlink Control Information (DCI) message, and wherein an indication of the beam reference information comprises a field in the DCI message.

A4. The method of solution A3, wherein the field in the DCI message comprises a Transmission Configuration Indicator (TCI) field or a Sounding Reference Signal Resource Indicator (SRI) field.

A5. The method of solution A3, wherein the indication provides one or more beam reference indices, wherein a first beam reference index of the one or more beam reference indices corresponds to a single Control Resource Set (CORESET).

A6. The method of solution A5, wherein a second beam reference index of the one or more beam reference indices corresponds to a Physical Downlink Shared Channel (PDSCH).

A7. The method of solution A5 or A6, wherein a Radio Resource Control (RRC) message or a first Medium Access Control (MAC) Control Element (CE) message comprises the mapping between a plurality of indications and a plurality beam reference indices for a CORESET or between the plurality of indications and a plurality of beam reference indices for the PDSCH.

A8. The method of solution A3, wherein the dedicated timeslot is K timeslots after the current timeslot, and wherein K is a non-negative integer.

A9. The method of solution A3, wherein the dedicated timeslot is K+K0 timeslots after the current timeslot, wherein a Physical Downlink Shared Channel (PDSCH) transmission is scheduled by the DCI message for transmission in a timeslot that is K0 timeslots after the current timeslot, and wherein K and K0 are non-negative integers A10. The method of solution A3, wherein the dedicated timeslot is K+K0+K1 timeslots after the current timeslot, wherein a Physical Downlink Shared Channel (PDSCH) transmission is scheduled by the DCI message for transmission in a timeslot that is K0 timeslots after the current timeslot, and wherein an Acknowledgement (ACK)/Negative ACK (NACK) feedback message of the PDSCH is scheduled in a timeslot that is K0+K1 timeslots after the current timeslot, and wherein K, K0 and K1 are non-negative integers.

A11. The method of any of solutions A8 to A10, wherein K is configured based on Radio Resource Control (RRC) signaling or capabilities of the wireless device.

A12. The method of any of solutions A8 to A10, wherein K is predefined.

A13. The method of solution A6, wherein the message comprising information related to transmission parameters comprises a first MACCE to activate M3 beam reference indices for at least two signals, wherein each of the at least two signals are selected from a first Control Resource Set (CORESET), a second CORESET, a Physical Downlink Shared Channel (PDSCH) resource, a first Physical Uplink Control Channel (PUCCH) resource, a second PUCCH resource, a first Sounding Reference Signal (SRS) resource, a second SRS resource, a first Channel State Information-Reference Signal (CSI-RS) resource, or a second SRS resource, and wherein M3 is an integer.

A14. The method of solution A13, wherein the message comprising information related to transmission parameters further comprises a second MACCE to select one or more beam reference indices from the activated M3 beam reference indices for each of the at least two signals.

A15. A wireless communications apparatus comprising a processor and a memory, wherein the processor is configured to read code from the memory and implement a method recited in any of solutions A1 to A14.

A16. A computer program product comprising a computer-readable program medium code stored thereupon, the code, when executed by a processor, causing the processor to implement a method recited in any of solutions A1 to A14.

Figure 4:
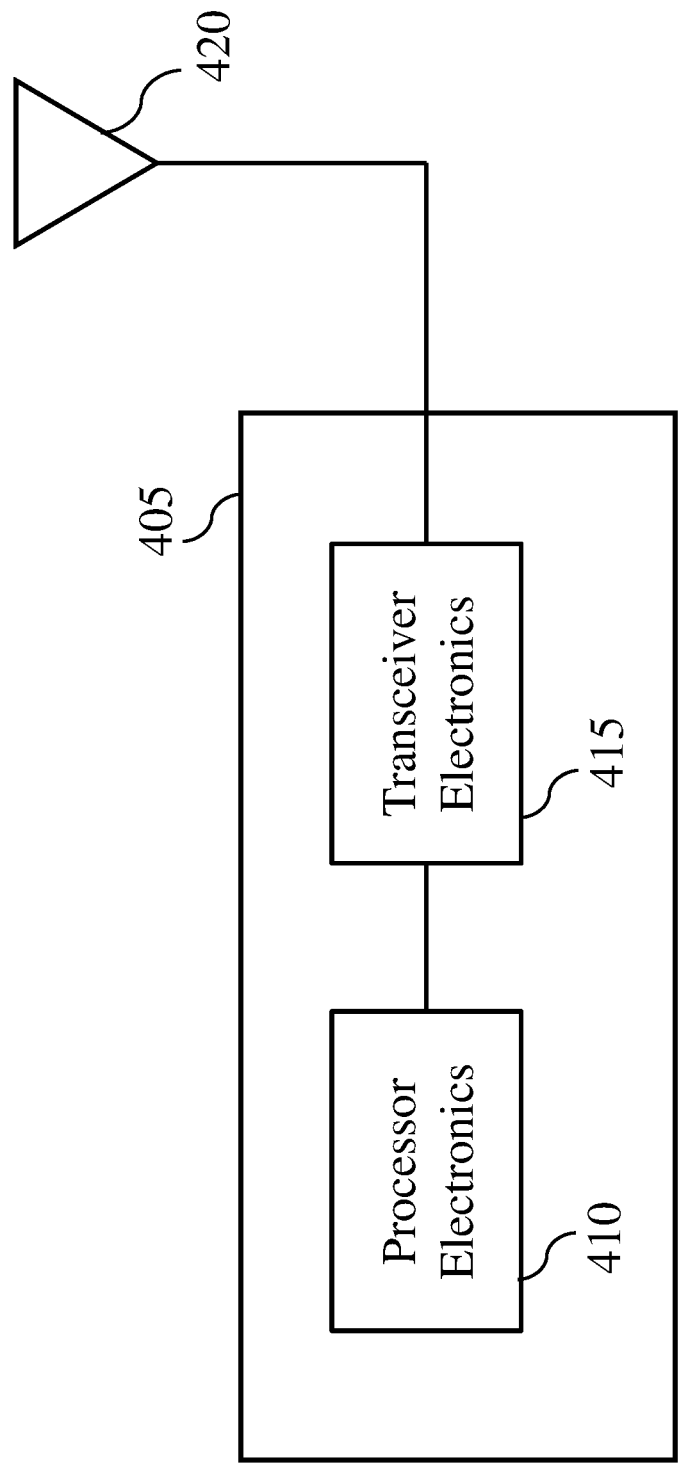
FIG. 4 is a block diagram representation of a portion of an apparatus, in accordance with some embodiments of the presently disclosed technology.

FIG. 4 is a block diagram representation of a portion of an apparatus, in accordance with some embodiments of the presently disclosed technology. An apparatus 405, such as a base station or a wireless device (or UE), can include processor electronics 410 such as a microprocessor that implements one or more of the techniques presented in this document. The apparatus 405 can include transceiver electronics 415 to send and/or receive wireless signals over one or more communication interfaces such as antenna(s) 420. The apparatus 405 can include other communication interfaces for transmitting and receiving data. Apparatus 405 can include one or more memories (not explicitly shown) configured to store information such as data and/or instructions. In some implementations, the processor electronics 410 can include at least a portion of the transceiver electronics 415.

In some embodiments, at least some of the disclosed techniques, modules or functions are implemented using the apparatus 405.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication comprising:
transmitting, by a network node to a wireless device, in a current timeslot, a beam reference information in a Downlink Control Information (DCI) message comprising information related to transmission parameters for receiving control channel information by the wireless device in a dedicated timeslot that is subsequent to the current timeslot, wherein the beam reference information comprises a quasi colocation (QCL) configuration or spatial relation configuration,
wherein an indication of the beam reference comprises a field in the DCI message and provides one or more beam reference indices, wherein a first beam reference index of the one or more beam reference indices corresponds to a single Control Resource Set (CORESET), and
wherein a Radio Resource Control (RRC) message or a first Medium Access Control (MAC) Control Element (CE) message provides a mapping between a plurality of indications and the one or more beam reference indices for a CORESET or between the plurality of indications and the one or more beam reference indices corresponds to a physical downlink shared channel (PDSCH).

2. The method of claim 1, wherein the field in the DCI message comprises a Transmission Configuration Indicator (TCI) field or a Sounding Reference Signal Resource Indicator (SRI) field.

3. The method of claim 1, wherein the dedicated timeslot is:
   (1) K timeslots after the current timeslot, and wherein K is a non-negative integer;
   (2) K+K0 timeslots after the current timeslot, wherein a Physical Downlink Shared Channel (PDSCH) transmission is scheduled by the DCI message for transmission in a timeslot that is K0 timeslots after the current timeslot, and wherein K and K0 are non-negative integers; or
   (3) K+K0+K1 timeslots after the current timeslot, wherein the Physical Downlink Shared Channel (PDSCH) transmission is scheduled by the DCI message for transmission in the timeslot that is K0 timeslots after the current timeslot, and wherein an Acknowledgement (ACK)/Negative ACK (NACK) feedback message of the PDSCH is scheduled in a timeslot that is K0+K1 timeslots after the current timeslot, and wherein K, K0 and K1 are non-negative integers.

4. The method of claim 1, wherein the message comprising information related to transmission parameters comprises a first MACCE to activate M3 beam reference indices for at least two signals, wherein the message comprising information related to transmission parameters further comprises a second MACCE to select a beam reference index from the activated M3 beam reference indices for each of the at least two signals,
wherein each of the at least two signals are selected from a first Control Resource Set (CORESET), a second CORESET, a Physical Downlink Shared Channel (PDSCH) resource, a first Physical Uplink Control Channel (PUCCH) resource, a second PUCCH resource, a first Sounding Reference Signal (SRS) resource, a second SRS resource, a first Channel State Information-Reference Signal (CSI-RS) resource, or a second CSI-RS resource, and wherein M3 is an integer.

5. A method for wireless communication comprising:
receiving, by a wireless device from a network node, in a current timeslot, a beam reference information in a Downlink Control Information (DCI) message comprising information related to transmission parameters for receiving control channel information by the wireless device in a dedicated timeslot that is subsequent to the current timeslot, wherein the beam reference information comprises a quasi colocation (QCL) configuration or spatial relation configuration,
wherein an indication of the beam reference comprises a field in the DCI message and provides one or more beam reference indices, wherein a first beam reference index of the one or more beam reference indices corresponds to a single Control Resource Set (CORESET), and
wherein a Radio Resource Control (RRC) message or a first Medium Access Control (MAC) Control Element (CE) message provides a mapping between a plurality of indications and the one or more beam reference indices for a CORESET or between the plurality of indications and the one or more beam reference indices corresponds to a physical downlink shared channel (PDSCH).

6. The method of claim 5, wherein the field in the DCI message comprises a Transmission Configuration Indicator (TCI) field or a Sounding Reference Signal Resource Indicator (SRI) field.

7. The method of claim 5, wherein the dedicated timeslot is:
(1) K timeslots after the current timeslot, and wherein K is a non-negative integer;
(2) K+K0 timeslots after the current timeslot, wherein a Physical Downlink Shared Channel (PDSCH) transmission is scheduled by the DCI message for transmission in a timeslot that is K0 timeslots after the current timeslot, and wherein K and K0 are non-negative integers; or
(3) K+K0+K1 timeslots after the current timeslot, wherein the Physical Downlink Shared Channel (PDSCH) transmission is scheduled by the DCI message for transmission in the timeslot that is K0 timeslots after the current timeslot, and wherein an Acknowledgement (ACK)/Negative ACK (NACK) feedback message of the PDSCH is scheduled in a timeslot that is K0+K1 timeslots after the current timeslot, and wherein K, K0 and K1 are non-negative integers.

8. The method of claim 5, wherein the message comprising information related to transmission parameters comprises a first MACCE to activate M3 beam reference indices for at least two signals, wherein the message comprising information related to transmission parameters further comprises a second MACCE to select a beam reference index from the activated M3 beam reference indices for each of the at least two signals,
wherein each of the at least two signals are selected from a first Control Resource Set (CORESET), a second CORESET, a Physical Downlink Shared Channel (PDSCH) resource, a first Physical Uplink Control Channel (PUCCH) resource, a second PUCCH resource, a first Sounding Reference Signal (SRS) resource, a second SRS resource, a first Channel State Information-Reference Signal (CSI-RS) resource, or a second CSI-RS resource, and wherein M3 is an integer.

9. An apparatus for wireless communication comprising a processor and a memory storing instructions, execution of which by the processor causes the apparatus to:
transmit, to a wireless device, in a current timeslot, a beam reference information in a Downlink Control Information (DCI) message comprising information related to transmission parameters for receiving control channel information by the wireless device in a dedicated timeslot that is subsequent to the current timeslot, wherein the beam reference information comprises a quasi colocation (QCL) configuration or spatial relation configuration,
wherein an indication of the beam reference comprises a field in the DCI message and provides one or more beam reference indices, wherein a first beam reference index of the one or more beam reference indices corresponds to a single Control Resource Set (CORESET), and
wherein a Radio Resource Control (RRC) message or a first Medium Access Control (MAC) Control Element (CE) message provides a mapping between a plurality of indications and the one or more beam reference indices for a CORESET or between the plurality of indications and the one or more beam reference indices corresponds to a physical downlink shared channel (PDSCH).

10. The apparatus of claim 9, wherein the field in the DCI message comprises a Transmission Configuration Indicator (TCI) field or a Sounding Reference Signal Resource Indicator (SRI) field.

11. The apparatus of claim 9, wherein the dedicated timeslot is:
(1) K timeslots after the current timeslot, and wherein K is a non-negative integer;
(2) K+K0 timeslots after the current timeslot, wherein a Physical Downlink Shared Channel (PDSCH) transmission is scheduled by the DCI message for transmission in a timeslot that is K0 timeslots after the current timeslot, and wherein K and K0 are non-negative integers; or
(3) K+K0+K1 timeslots after the current timeslot, wherein the Physical Downlink Shared Channel (PDSCH) transmission is scheduled by the DCI message for transmission in the timeslot that is K0 timeslots after the current timeslot, and wherein an Acknowledgement (ACK)/Negative ACK (NACK) feedback message of the PDSCH is scheduled in a timeslot that is K0+K1 timeslots after the current timeslot, and wherein K, K0 and K1 are non-negative integers.

12. The apparatus of claim 9, wherein the message comprising information related to transmission parameters comprises a first MACCE to activate M3 beam reference indices for at least two signals, wherein the message comprising information related to transmission parameters further comprises a second MACCE to select a beam reference index from the activated M3 beam reference indices for each of the at least two signals,
wherein each of the at least two signals are selected from a first Control Resource Set (CORESET), a second CORESET, a Physical Downlink Shared Channel (PDSCH) resource, a first Physical Uplink Control Channel (PUCCH) resource, a second PUCCH resource, a first Sounding Reference Signal (SRS) resource, a second SRS resource, a first Channel State Information-Reference Signal (CSI-RS) resource, or a second CSI-RS resource, and wherein M3 is an integer.

13. An apparatus for wireless communication comprising a processor and a memory storing instructions, execution of which by the processor causes the apparatus to:
receive, from a network node, in a current timeslot, a beam reference information in a Downlink Control Information (DCI) message comprising information related to transmission parameters for receiving control channel information by the apparatus in a dedicated timeslot that is subsequent to the current timeslot, wherein the beam reference information comprises a quasi colocation (QCL) configuration or spatial relation configuration,
wherein an indication of the beam reference comprises a field in the DCI message and provides one or more beam reference indices, wherein a first beam reference index of the one or more beam reference indices corresponds to a single Control Resource Set (CORESET), and
wherein a Radio Resource Control (RRC) message or a first Medium Access Control (MAC) Control Element (CE) message provides a mapping between a plurality of indications and the one or more beam reference indices for a CORESET or between the plurality of indications and the one or more beam reference indices corresponds to a physical downlink shared channel (PDSCH).

14. The apparatus of claim 13, wherein the field in the DCI message comprises a Transmission Configuration Indicator (TCI) field or a Sounding Reference Signal Resource Indicator (SRI) field.

15. The apparatus of claim 13, wherein the dedicated timeslot is:
(1) K timeslots after the current timeslot, and wherein K is a non-negative integer;
(2) K+K0 timeslots after the current timeslot, wherein a Physical Downlink Shared Channel (PDSCH) transmission is scheduled by the DCI message for transmission in a timeslot that is K0 timeslots after the current timeslot, and wherein K and K0 are non-negative integers; or
(3) K+K0+K1 timeslots after the current timeslot, wherein the Physical Downlink Shared Channel (PDSCH) transmission is scheduled by the DCI message for transmission in the timeslot that is K0 timeslots after the current timeslot, and wherein an Acknowledgement (ACK)/Negative ACK (NACK) feedback message of the PDSCH is scheduled in a timeslot that is K0+K1 timeslots after the current timeslot, and wherein K, K0 and K1 are non-negative integers.

16. The apparatus of claim 13, wherein the message comprising information related to transmission parameters comprises a first MACCE to activate M3 beam reference indices for at least two signals, wherein the message comprising information related to transmission parameters further comprises a second MACCE to select a beam reference index from the activated M3 beam reference indices for each of the at least two signals,
wherein each of the at least two signals are selected from a first Control Resource Set (CORESET), a second CORESET, a Physical Downlink Shared Channel (PDSCH) resource, a first Physical Uplink Control Channel (PUCCH) resource, a second PUCCH resource, a first Sounding Reference Signal (SRS) resource, a second SRS resource, a first Channel State Information-Reference Signal (CSI-RS) resource, or a second CSI-RS resource, and wherein M3 is an integer.

17. The apparatus of claim 13, wherein a second beam reference index of the one or more beam reference indices corresponds to the PDSCH.

18. The apparatus of claim 15, wherein K is configured based on Radio Resource Control (RRC) signaling or capabilities of the apparatus, or wherein K is predefined.

19. The apparatus of claim 16, wherein the message comprising information related to transmission parameters further comprises a second MACCE to select one or more beam reference indices from the activated M3 beam reference indices for each of the at least two signals.

* * * * *